(12) United States Patent
Potocki et al.

(10) Patent No.: US 11,821,053 B2
(45) Date of Patent: Nov. 21, 2023

(54) SYSTEM FOR CONDITIONING MATERIAL USING A LASER AND METHOD THEREOF

(71) Applicant: MAGNA INTERNATIONAL INC., Ontario (CA)

(72) Inventors: John Richard Potocki, Armada, MI (US); Steven Reece Falter, Lake Orion, MI (US)

(73) Assignee: MAGNA INTERNATIONAL INC., Ontario (CA)

( * ) Notice: Subject to any disclaimer, the term of this patent is extended or adjusted under 35 U.S.C. 154(b) by 883 days.

(21) Appl. No.: 15/738,776

(22) PCT Filed: Jun. 30, 2016

(86) PCT No.: PCT/US2016/040279
§ 371 (c)(1),
(2) Date: Dec. 21, 2017

(87) PCT Pub. No.: WO2017/004314
PCT Pub. Date: Jan. 5, 2017

(65) Prior Publication Data
US 2018/0187281 A1 Jul. 5, 2018

Related U.S. Application Data

(60) Provisional application No. 62/186,430, filed on Jun. 30, 2015.

(51) Int. Cl.
*C21D 9/50* (2006.01)
*B23K 26/00* (2014.01)
(Continued)

(52) U.S. Cl.
CPC ............ *C21D 9/50* (2013.01); *B23K 9/167* (2013.01); *B23K 9/173* (2013.01); *B23K 26/00* (2013.01);
(Continued)

(58) Field of Classification Search
CPC ... C21D 9/50; C21D 1/34; C21D 1/04; B23K 9/167; B23K 9/173; B23K 26/00;
(Continued)

(56) References Cited

U.S. PATENT DOCUMENTS 4,535,218 A * 8/1985 Krause ................. B23K 26/073
219/121.68
6,923,877 B1 * 8/2005 Anderson ............ C21D 10/005
427/457
(Continued)

FOREIGN PATENT DOCUMENTS

EP 0730040 A1 9/1996

OTHER PUBLICATIONS

Kirkemo, Finn. "Design of Compact Flange Joints." Analysis of Bolted Joints, 2002 (Year: 2002).*
(Continued)

*Primary Examiner* — Kevin E Yoon
*Assistant Examiner* — Ryan L Heckman
(74) *Attorney, Agent, or Firm* — Pillsbury Winthrop Shaw Pittman, LLP

(57) ABSTRACT

A method for conditioning a welded vehicle body assembly is provided. The method includes welding the vehicle body member to at least one additional vehicle body member together to form the welded vehicle body assembly, the welded vehicle body assembly includes a weld area; and laser annealing a weld heat affected zone adjacent to the weld area to soften material in the weld heat affected zone.

17 Claims, 13 Drawing Sheets

(51) Int. Cl.
*C21D 1/34* (2006.01)
*C22F 1/04* (2006.01)
*B23K 9/167* (2006.01)
*B23K 9/173* (2006.01)
*B23K 31/02* (2006.01)
*B23K 101/00* (2006.01)
*C21D 1/09* (2006.01)
*C21D 1/26* (2006.01)

(52) U.S. Cl.
CPC ............ *B23K 31/02* (2013.01); *C21D 1/34* (2013.01); *C22F 1/04* (2013.01); *B23K 2101/006* (2018.08); *C21D 1/09* (2013.01); *C21D 1/26* (2013.01)

(58) Field of Classification Search
CPC .... B23K 31/02; B23K 2101/006; B23K 1/09; B23K 1/26
See application file for complete search history.

(56) References Cited

U.S. PATENT DOCUMENTS

| | | | |
|---|---|---|---|
| 7,063,755 B2 | 6/2006 | Nolan | |
| 7,540,402 B2 | 6/2009 | McCrink et al. | |
| 7,555,833 B2 | 7/2009 | Wang | |
| 8,234,770 B2* | 8/2012 | Durandet | B21J 15/025 29/525.01 |
| 8,424,961 B2 | 4/2013 | Carsley et al. | |
| 2004/0222201 A1* | 11/2004 | Yamazaki | B23K 26/00 219/121.67 |
| 2005/0039828 A1* | 2/2005 | Nolan | C22F 1/04 148/565 |
| 2008/0273867 A1* | 11/2008 | Camm | H01L 21/268 392/416 |
| 2010/0121472 A1* | 5/2010 | Babu | B23K 9/02 700/104 |
| 2011/0006559 A1* | 1/2011 | Schafers | B21D 53/88 296/181.1 |
| 2011/0163256 A1* | 7/2011 | Seitter | H01F 7/081 252/62.55 |
| 2011/0168682 A1* | 7/2011 | Hagihara | B23K 26/244 219/121.64 |
| 2012/0018977 A1 | 1/2012 | Stanifer et al. | |
| 2012/0325379 A1 | 12/2012 | Baulig et al. | |
| 2013/0139932 A1* | 6/2013 | Sakai | H01F 41/0206 148/307 |
| 2014/0106545 A1* | 4/2014 | Okada | B23K 26/40 438/463 |
| 2014/0197145 A1* | 7/2014 | Veeramani | B23K 26/38 219/121.72 |
| 2014/0263225 A1* | 9/2014 | Daniel | B23K 9/1043 219/125.1 |
| 2014/0373589 A1 | 12/2014 | Potocki | |
| 2015/0147111 A1* | 5/2015 | Teague | B23K 31/02 403/271 |
| 2016/0046050 A1* | 2/2016 | Ikeda | B32B 27/08 219/121.66 |
| 2016/0076115 A1* | 3/2016 | Zeng | C21D 1/70 266/249 |
| 2016/0138992 A1* | 5/2016 | Durrant | B23K 31/02 73/706 |
| 2016/0243702 A1* | 8/2016 | Crothers | B64F 5/00 |
| 2018/0015669 A1* | 1/2018 | Moore | B29C 64/245 |

OTHER PUBLICATIONS

Written Opinion of the International Searching Authority PCT/US2016/040279 dated Nov. 18, 2016.
International Search Report PCT/US2016/040279 dated Nov. 18, 2016.
International Preliminary Report on Patentability PCT/US2016/040279 dated Jan. 2, 2018.

* cited by examiner a) 20mm/s TRAVELLING SPEED:
   TIME TO TRAVEL 6mm (≙ SPOT DIAM.) = $\frac{6mm}{20\ mm/s}$ = 0.3s 60mm (= 10x SPOT SIZE)
IN 3s ENERGY EXPOSED TO A SPECIFIC AREA:
   e.g. 6mm TRAVEL LENGTH: 300W x 0.3s = 90J ENERGY DENSITY = $\frac{90J}{6mm \times 6mm}$ = 2.5 J/mm$^2$ b) 30mm/s TRAVELLING SPEED:
   TIME TO TRAVEL 6mm : 0.2s
   ENERGY PER 6mm TRAVEL LENGTH : 60J
   ENERGY DENSITY · 1.7J/mm$^2$

SYSTEM FOR CONDITIONING MATERIAL USING A LASER AND METHOD THEREOF

CROSS-REFERENCE TO RELATED APPLICATIONS

This application is the U.S. National Stage of PCT/US2016/040279, filed Jun. 30, 2016, which in turn claims priority to U.S. Provisional Patent Application Ser. No. 62/186,430, filed on Jun. 30, 2015, the entire contents of both of these applications are incorporated herein by reference in their entireties.

FIELD

The present patent application relates to a system and a method for conditioning material of a vehicle body member using a laser.

BACKGROUND

Self-piercing rivets are used in vehicle body assemblies. The self-piercing rivet generally includes a head end and an opposing, formed button end. During the manufacturing process, high pressure die castings are heat treated to prevent micro cracking and the subsequent corrosion of the castings on the "button" side/end of the self-piercing rivet.

For high pressure die casting of aluminum members, various oven or solution heat treatment methods are used on the completed/formed/assembled member. Heat treating the entire member, panel, or casting may generally require large and expensive heat treating systems. These heat treating systems may use large amounts of floor space and may be inherently slow. They also tend to induce distortion in the panels.

The present patent application provides improvements to the systems and methods for conditioning material of the vehicle body member or assembly.

SUMMARY

One aspect of the present patent application provides a method for conditioning a welded vehicle body assembly. The method includes welding the vehicle body member to at least one additional vehicle body member together to form the welded vehicle body assembly, the welded vehicle body assembly has a weld area; and laser annealing a weld heat affected zone adjacent to the weld area to soften material in the weld heat affected zone.

Another aspect of the present patent application provides a method for conditioning a vehicle body member. The method includes laser conditioning selective portions of the vehicle body member; and penetrating a fastening member at least partially through the laser conditioned selective portions so as to fasten the vehicle body member to at least one additional vehicle body member.

Yet another aspect of the present patent application provides a method for conditioning a B-pillar of a vehicle. The B-pillar having a top end and a bottom end. The method includes laser conditioning selective portions of the B-pillar to change a property of the material in the selective portions of the B-pillar from a first property value to a second property value. The selective portions of the B-pillar are disposed at a distance in a range of 6 to 12 inches from the bottom end of the B-pillar.

While the present patent application can be used for forming automobile or vehicle body panels or members or assemblies, the same system and method can be used to form sheet steel that can be used for other applications.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise.

BRIEF DESCRIPTION OF THE DRAWINGS

Various embodiments will now be disclose, by way of example only, with reference to the accompanying schematic drawings in which corresponding reference symbols indicate corresponding parts, in which

FIGS. 5A and 5B illustrate locations at which the B-pillar is laser conditioning or annealed in accordance with an embodiment of the present patent application;

DETAILED DESCRIPTION

Figure 1:
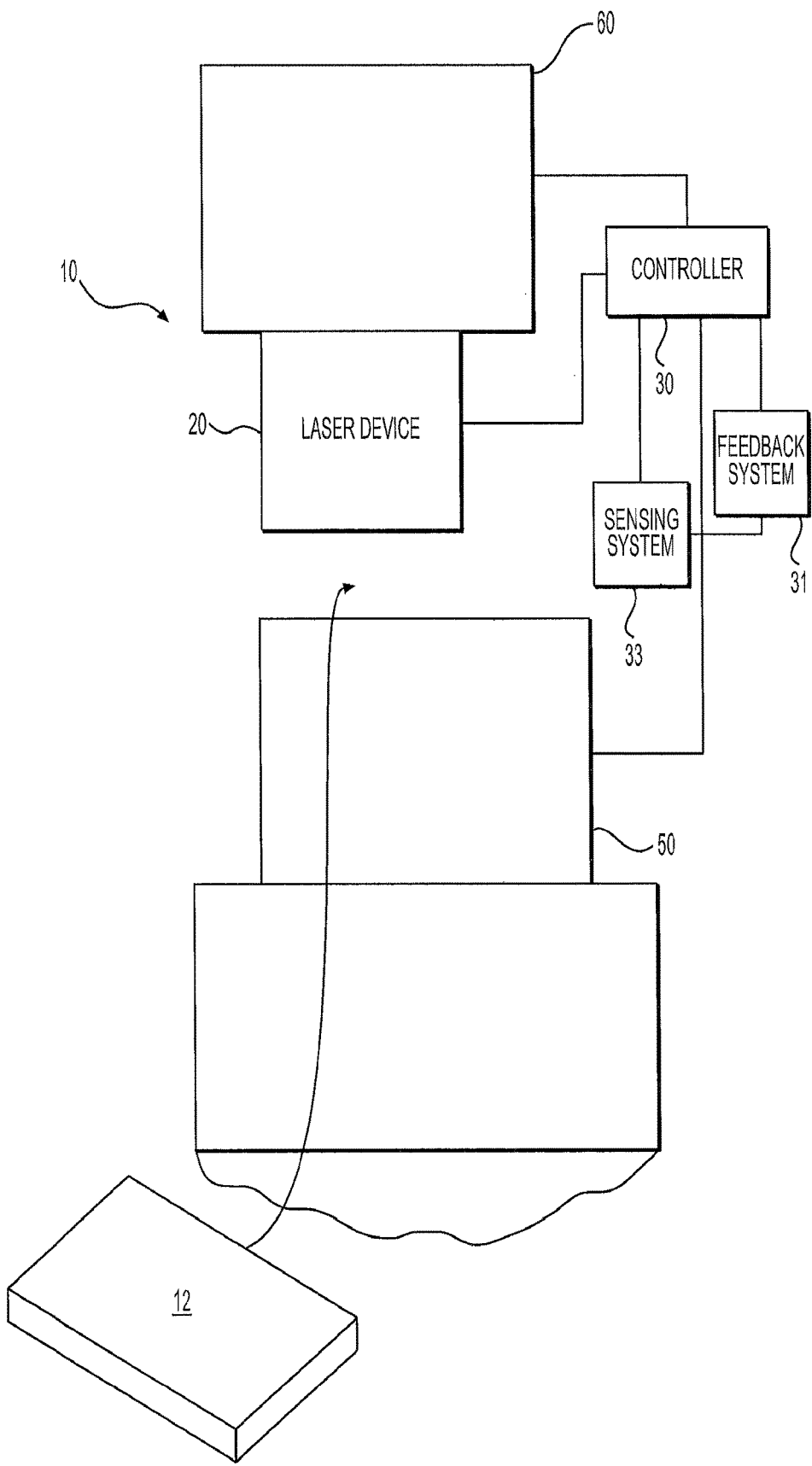
FIG. 1 is a schematic diagram of a system for conditioning a vehicle body member or assembly in accordance with an embodiment of the present patent application.

FIG. 1 is a schematic diagram of a system 10 for conditioning a vehicle body assembly, member or panel 12. In one embodiment, the system 10 may be disposed in a vehicle manufacturing facility. In one embodiment, the system 10 may include a laser device 20 and a controller or control mechanism 30.

In one embodiment, the laser device 20 may be configured to provide a laser radiation or beam to at least a portion of a vehicle body assembly or member 12 so as to condition the material of the portion of the vehicle body assembly or member 12 during a laser conditioning procedure. In one embodiment, the laser device 20 may be a laser beam generation unit having a laser source therein. In one embodiment, the laser source may be configured to generate a laser beam. That is, the laser device 20 may be configured to provide a laser beam to at least a portion of the vehicle body member or assembly to change a property of the material in at least the portion of the vehicle body member or assembly 12 from a first property value to a second property value. In one embodiment, the property of the material may be one or more of hardness, elongation, fatigue life, or ductility. In one embodiment, the laser beam has sufficient power to change a property of the material in at least the portion of the vehicle body member or assembly 12 from the first property value to the second property value.

In one embodiment, the laser device 20 may be a large area laser diode device. For example, in one embodiment, the laser diode device 20 may be an electrically pumped semiconductor laser having an active laser medium that is formed by a p-n junction of a semiconductor diode.

In one embodiment, the laser device 20 may be a carbon dioxide laser device ($CO_2$ laser). In one embodiment, the laser device 20 may be a fiber laser device. In one embodiment, a fiber laser is a laser in which the active gain medium is an optical fiber doped with rare-earth elements such as erbium, ytterbium, neodymium, dysprosium, praseodymium, and thulium. In one embodiment, the fiber laser device or the $CO_2$ laser device may be configured to deliver a defocused laser beam having a desired spot size.

In one embodiment, the large area laser device 20 may be configured to provide high wattage of output power. For example, in one embodiment, the large area laser device 20 may be configured to provide output power in the range of 500 watts to 500 Kilo watts. In another embodiment, the large area laser device 20 may be configured to provide output power in the range of 300 watts to 950 watts. In another embodiment, the large area laser device 20 may be configured to provide output power in the range of 100 watts to 10 Kilo watts. In one embodiment, the large area laser device 20 may be configured to produce a large area output laser beam.

In one embodiment, the large area laser device 20 may be a diode stack that includes a number of diode bars that are arranged in the form of a stack. In one embodiment, the diode stack may be a vertical stack. In another embodiment, the diode stack may have a bee hive design. For example, the laser device may include laser diodes that are stacked into bundles and the system is configured to funnel the laser beams from the stacked laser diodes to a desired laser spot.

In one embodiment, the laser device 20 may have a laser beam spot size of up to 75 square millimeters. In another embodiment, the laser device 20 may have a laser beam spot size of up to 120 square millimeters. In one embodiment, the laser device 20 may have a laser beam spot size in a range of about 70 and 130 square millimeters. In one embodiment, the laser beam spot size of the laser beam may also be referred to as a laser beam emitting area. In one embodiment, the larger spot size is configured to affect the cycle time for producing laser conditioned or annealed vehicle body assembly or member.

In one embodiment, during the laser annealing or conditioning procedure, the laser device 20 is configured to emit a laser beam having a wavelength to anneal or condition the material of the vehicle body member or assembly 12. In one embodiment, the wavelength may be chosen such that the material (being laser conditioned or annealed) is heated to just below its melting temperature.

In one embodiment, during the laser annealing or conditioning procedure, the laser device 20 may be configured to heat the material of the vehicle body member or assembly 12 up to a melting temperature of the material (being laser conditioned or annealed) by its laser beam or illumination. In one embodiment, during the laser annealing or conditioning procedure, the laser device 20 may be configured to heat the material of the vehicle body member or assembly 12 to just below or under the melting temperature of the material (being laser conditioned or annealed) by its laser beam or illumination.

In one embodiment, during the laser annealing or conditioning procedure, the laser device 20 may be configured to anneal or condition the material of the vehicle body member or assembly 12 for a time period. In one embodiment, the time period may be chosen such that the material (being laser conditioned or annealed) is heated to just below its melting temperature.

In one embodiment, when the laser device 20 having an output power of 300 watts and a laser diameter of 6 mm is used to heat the material for 4 seconds, the temperature of the laser annealed or laser conditioned material reaches 200° C. In one embodiment, when the laser device 20 having an output power of 400 watts and a laser diameter of 6 mm is used to heat the material for 4 seconds, the temperature of the laser annealed or laser conditioned material reaches 255° C. In one embodiment, when the laser device 20 having an output power of 500 watts and a laser diameter of 6 mm is used to heat the material for 4 seconds, the temperature of the laser annealed or laser conditioned material reaches 342° C. In one embodiment, when the laser device 20 having an output power of 750 watts and a laser diameter of 6 mm is used to heat the material for 4 seconds, the temperature of the laser annealed or laser conditioned material reaches 460° C. In one embodiment, when the laser device 20 having an output power of 955 watts and a laser diameter of 6 mm is used to heat the material for 4 seconds, the temperature of the laser annealed or laser conditioned material reaches 462° C. In one embodiment, when the laser device 20 having an output power of 650 watts and a laser diameter of 12 mm is used to heat the material for 7 seconds, the temperature of the laser annealed or laser conditioned material reaches 300° C.

In one embodiment, the laser device 20 may include a single laser spot or multiple laser spots that may be used in conjunction to perform the laser conditioning procedure. In one embodiment, a large laser spot size and the use of multiple laser spots may increase the system's throughput. Also, by directing or focusing the large area laser device 20 to condition the material of a desired portion(s) of the vehicle body member or assembly (or panel or casting) 12, the entire vehicle body member or assembly (or panel or casting) does not need to be heated which greatly reduces the possibility of distortion. This large laser spot size and the use of multiple laser spots configuration may also be used for improving fatigue life around welded areas.

In one embodiment, the system 10 is configured to condition the material of the portion(s) of the vehicle body assembly 12 during a laser conditioning procedure. For example, as will be explained in detail below with respect to FIGS. 2A and 2B, the vehicle body assembly 12 is a welded vehicle body assembly. In one embodiment, the system 10 is configured to condition or soften the material around the welds of the welded vehicle body assembly.

In another embodiment, the system 10 is configured to condition the material of the portion(s) of the vehicle body member 12 during a laser conditioning procedure. For example, as will be explained in detail below with respect to FIGS. 3A-3C, 4A-4C, and 5A-5C, the vehicle body member 12 is a vehicle body sheet or panel, a vehicle body casting, or a vehicle pillar (B-pillar). In one embodiment, the system 10 is configured to condition the material in selective portions of the vehicle body member, for example, to allow for setting self-piercing rivets, to prevent cracking of a work piece or vehicle body member on "button" side of the self-piercing rivets, and/or to meet vehicle performance specifications as detailed in the discussion below. In one embodiment, the controller 30 may be configured to receive a user input and, based on the user input, control the laser device 20. In another embodiment, the controller 30 may be part of a feedback system 31 (described in detail below) and is configured to automatically control the laser device 20.

In one embodiment, the system 10 may also include a support member 50 that is configured to support the vehicle body assembly or member 12 thereon during the laser conditioning procedure. In one embodiment, the support member 50 may be operatively connected to the controller 30. In one embodiment, the controller 30 is configured to precisely control and position the support member 50 during the laser annealing and conditioning procedure. In one embodiment, the support member 50 may be a moveable member that is configured to traverse the vehicle body assembly or member 12 under the laser device 20.

In one embodiment, the system 10 may also include a laser support member 60 that is configured to support the laser device 20. In one embodiment, the laser support member 60 may be operatively connected to the controller 30. In one embodiment, the controller 30 is configured to precisely control and position the laser support member 60 (and hence the laser device 20) during the laser annealing and conditioning procedure. In one embodiment, the laser support member 60 may be a moveable member that is configured to traverse the laser device 20 over the support member 50 (and the vehicle body assembly or member 12 positioned thereon).

In one embodiment, the laser support member 60, the laser device 20, the controller 30 and the support member 50 may be together referred to as a laser conditioning station or system. In one embodiment, the laser support member 60 and the support member 50 may be both moveable members. In another embodiment, only one of the laser support member 60 and the support member 50 may be moveable, while the other of the laser support member 60 and the support member 50 may be stationary. In yet another embodiment, the laser support member 60 and the support member 50 may be both stationary members. In one embodiment, the laser support member 60 and the support member 50 are optional.

Figure 1A:
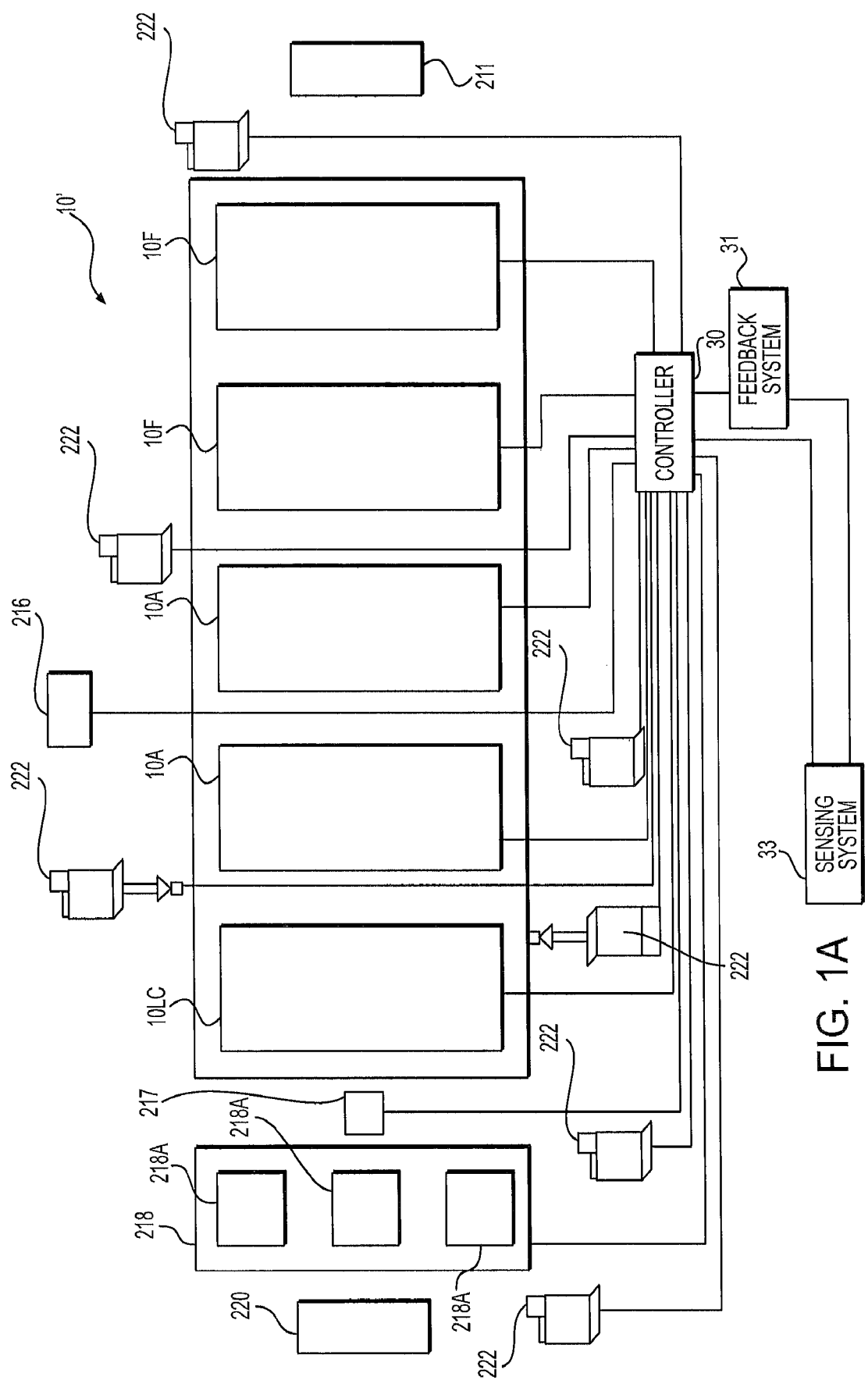
FIG. 1A is a schematic diagram of a system for both forming and conditioning a vehicle body member or assembly in accordance with an embodiment of the present patent application.

FIG. 1A shows a schematic diagram of the system 10 configured for both forming and conditioning a vehicle body member or assembly 12 in accordance with an embodiment of the present patent application. In one embodiment, the system 10 may include one or more forming stations 10F that are configured to form a vehicle body member from a metal material and/or one or more assembly stations 10A that are configured to assemble the vehicle body member with at least one additional vehicle body member to form the vehicle body assembly. In one embodiment, the number of forming stations 10F and assembly stations 10A in the manufacturing facility may vary.

In one embodiment, the one or more forming stations 10F may be configured to perform one or more of the following operations, including, but not limited to, stamping, bending, blanking, flanging, stretching, hemming, piercing, trimming, pressing, drawing, roll forming, hydroforming, hot forming, hot stamping, die casting, high pressure die casting or any other metal forming operations. In one embodiment, the one or more assembly stations 10A may be configured to perform one or more of the following operations, including, but not limited to, welding, bonding, securing, joining, fastening, riveting or any other assembly operations. In one embodiment, a forming system or press in the manufacturing facility may include both the one or more forming stations and the one or more assembly stations 10A. In another embodiment, the one or more forming stations 10F and the one or more assembly stations 10A may be separate and distinct from each other.

In one embodiment, the laser conditioning station/system 10LC may be positioned sequentially, adjacent to the forming station 10F and/or assembly station 10A. In one embodiment, the one or more assembly stations 10A are disposed, in the manufacturing facility, within a predetermined distance from the one or more forming stations 10F and/or the laser conditioning station/system 10LC.

Figure 8:
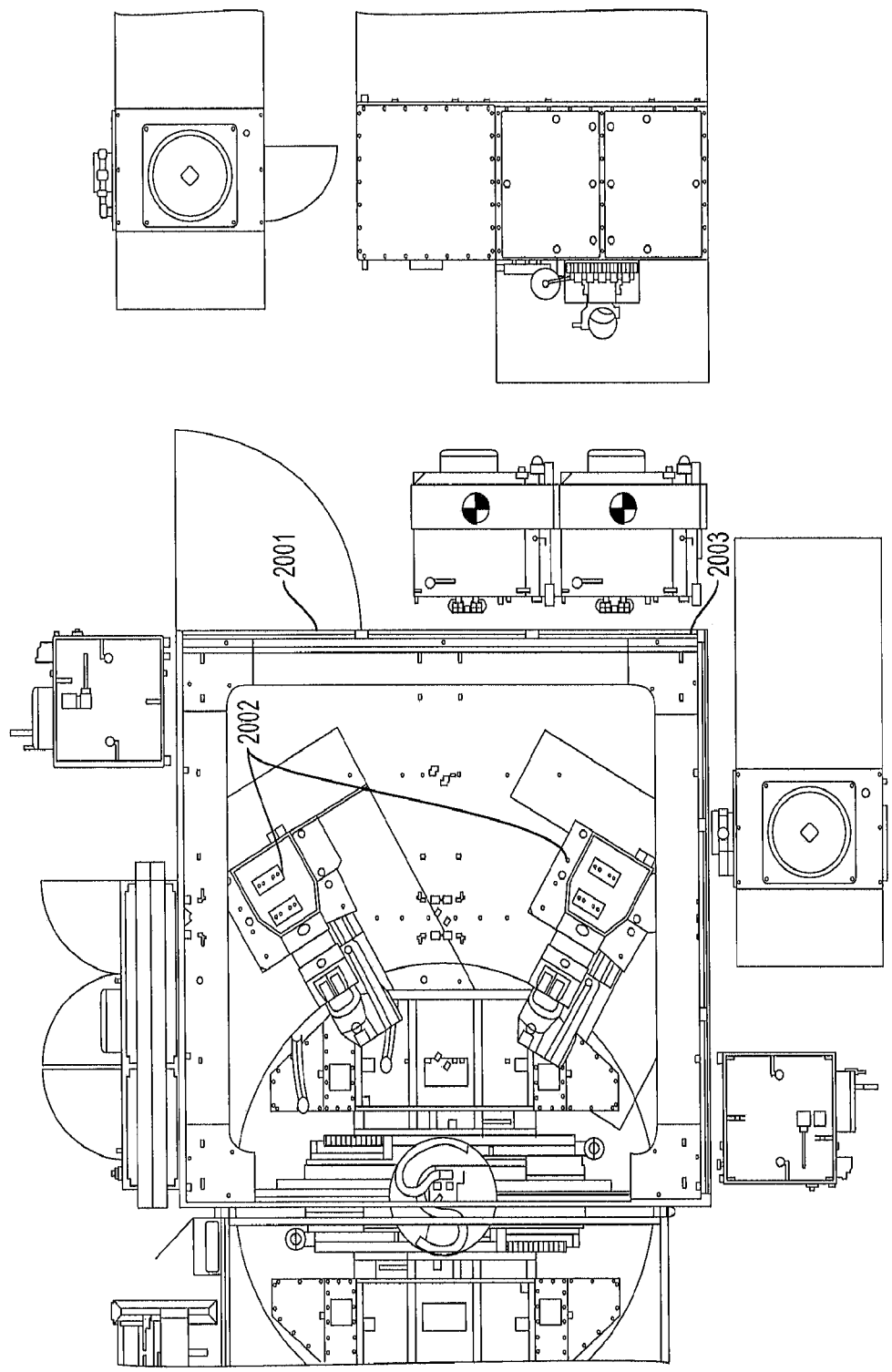
FIG. 8 shows a laser annealing station or cell in the accordance with an embodiment of the present patent application.

In one embodiment, a laser annealing station or cell 2001 is shown in FIG. 8. Referring to FIG. 8, the laser annealing station or cell 2001 may include one or more robot systems (with end effectors) 2002 that are configured to transfer the vehicle body member or assembly 12 (to be laser conditioned/annealed) into or out of the laser annealing station or cell 2001. In one embodiment, the laser device 20 may be configured to be positioned on the robot systems 2002. In one embodiment, the laser annealing station or cell 2001 may include a safety enclosure 2003 configured to surround the perimeter of the laser annealing station or cell 2001. In one embodiment, the laser annealing station or cell 2001 may include a cooling system (e.g., a cooling jacket or an air cooling system) configured to maintain a predetermined temperature within the laser annealing station or cell 2001.

In one embodiment, a transfer system 222 may be configured to move the developed blank or vehicle body member(s) from the forming station 10F to the assembly station 10A. In one embodiment, the transfer system 222 may be configured to move the developed blank or vehicle body member(s) from the forming station 10F to the laser conditioning station 10LC and/or to move the vehicle body assembly from the assembly station 10A to the laser conditioning station 10LC. In one embodiment, the transfer system 222 may include a conveyor (e.g., overhead gantry or belt) or a robot system (with changeable end effectors). In one embodiment, the transfer system 222 may be a linear transfer system. In one embodiment, the transfer system 222 may include a combination of a linear transfer system and robots.

In one embodiment, in addition to the forming station(s) 10F, the assembly stations(s) 10A, laser conditioning system 10LC and the transfer system 222, the system 10 of the present application may include a loading station 211, a quality control station(s)/quality control system 217, a secondary forming or assembly system 216, a post assembly system 218 with one or more post assembly stations 218A, and a storage or unloading system 220. In one embodiment, the loading station 211, the secondary forming or assembly system 216 and the post assembly system 218 are optional.

In one embodiment, the laser conditioning or annealing may be a fully automated process. In one embodiment, the laser support member 60 and/or the support member 50 may be operatively associated with the controller 30 such that the controller 30 may be configured to automatically control the movement of the laser support member 60 (and hence the laser device 20) and/or the support member 50 (and hence the vehicle body assembly/member 12 being laser conditioned). For example, in one embodiment, the laser conditioning system may include the feedback system 31, as described in detail below, which is configured to provide a real-time monitoring and control of the laser conditioning or annealing procedures to help achieve the optimum performance and maximum productivity.

In one embodiment, each of the forming station(s) 10F, the assembly station(s) 10A, the laser conditioning system 10LC and/or other stations/systems in the manufacturing facility may be fully automated. In one embodiment, each of the laser device 20 (or laser conditioning system 10LC), the forming stations 10F, the assembly stations 10A, and the transfer system 222 may be a computer-controlled automated system. That is, each of the forming station(s) 10F, the assembly station(s) 10A, the laser conditioning system 10LC and/or other stations/systems in the manufacturing facility may include controller(s), sensors, motors, and/or systems for precisely controlling their respective operational procedures. Also, in one embodiment, the procedure of the transferring the vehicle body assembly/member 12 between the forming station(s) 10F, the assembly station(s) 10A, the laser conditioning system 10LC and/or other stations/systems in the manufacturing facility may be fully automated (e.g., by a robot system).

In one embodiment, the controller 30 may be configured to operatively associated with the laser device 20/10LC, the forming stations 10F, the transfer system 222, the assembly station 10A, and/or other systems/stations or devices in the manufacturing facility such that the controller 30 is configured to control and coordinate the movements and operations of these systems and devices. In one embodiment, the controller 30 may include a processor and a memory for storing operational instructions for controlling the operations of each of the laser device 20 (or laser conditioning system 10LC), the forming stations 10F, the assembly stations 10A, and the transfer system 222.

In one embodiment, the procedures of the patent application may be computer-controlled automated manufacturing procedures. In one embodiment, the automated manufacturing operational instructions and other information may be provided from a remote location(s) (e.g., a remote control center) for executing by the system disposed in the manufacturing facility.

In one embodiment, the system 10 may include a sensing system 33 that is configured to obtain the laser annealing/conditioning information. In one embodiment, the laser annealing/conditioning information may include structural information of the material. In one embodiment, the sensing system 33 may be an imaging system that is configured to image the material being laser conditioned or annealed. In one embodiment, the sensing system may be a camera that is configured to image rear or back side of the material and configured to determine whether the desired temperature of the material is achieved. In another embodiment, the sensing system 33 is optional.

The system 10 may also include the feedback system 31 that uses the obtained laser annealing/conditioning information to control the properties of the laser device 20 so as to improve the laser conditioning or annealing procedure. That is, the operation parameters of the laser device 20 may be controlled to achieve the optimum the laser conditioning or annealing. For example, in one embodiment, the feedback system 31 is configured to automatically turn off the laser device 20 when the obtained laser annealing conditioning information indicates that the laser conditioning or annealing is completed. In another embodiment, the feedback system 31 is configured to automatically control the operational parameters of the laser device 20 so as to further improve the laser conditioning or annealing procedure. In one embodiment, the operational parameters of the laser device 20 may include intensity, pulse width, duty cycle, power, number of pulses and/or time delay between the pulses. In another embodiment, the feedback system 31 is configured to automatically vary the distance between the laser device 20 and the material being annealed or conditioned so as to further improve the laser conditioning or annealing procedure.

In one embodiment, the sensing system 33, the controller 30 and the laser device 20 are operatively connected to each other and together form the feedback system. Thus, the feedback system provides a real-time monitoring and control of the laser conditioning or annealing procedure. For example, monitoring and control of the laser conditioning or annealing procedure of the material in real time may help achieve the optimum performance and maximum productivity.

In one embodiment, the process variables of heating high pressure die cast aluminum or high strength steels may include speed (i.e., how fast the heating is performed), time (i.e., how long the heating is performed), and energy (e.g., energy density per a particular setting of the speed and time).

Figure 6:
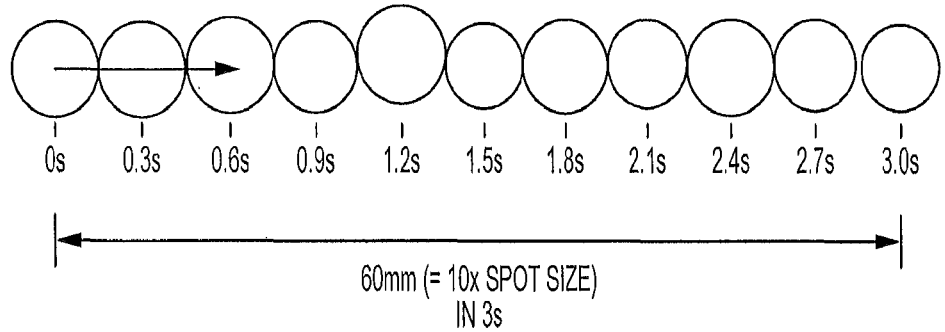
FIGS. 6 and 7 show laser energy density calculations and laser energy density for lasers moving at different speeds and at various time points in accordance with an embodiment of the present patent application.
Figure 6:
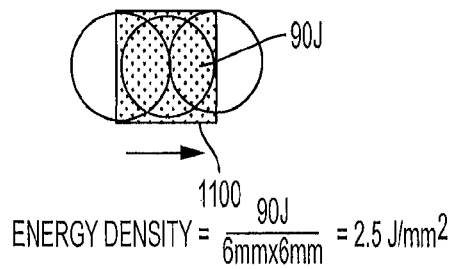

For example, for a laser traveling at a speed of 20 mm/second, the time to travel 6 mm laser spot size or diameter is 0.3 seconds (i.e., 6 mm/(20 mm/second)). The same laser (with traveling speed of 20 mm/second) takes 3 seconds to travel 60 mm laser spot size or diameter (i.e., 10 times the 6 mm laser spot size or diameter). Laser energy exposed to a specific area 1100 (as shown in FIG. 6) of 6 mm travel length is 90 Joules (i.e., 300 W×0.3 seconds). The energy density for this setting is 2.5 Joules/mm$^2$ (i.e., 90 Joules/(6 mm×6 mm)). These calculations are shown in FIG. 6.

For a laser traveling at a speed of 30 mm/second, the time to travel 6 mm laser spot size or diameter is 0.2 seconds (6 mm/(30 mm/second)). Laser energy exposed to a specific area of 6 mm travel length is 60 Joules (i.e., 300 W×0.2 seconds). The energy density for this setting is 1.67 Joules/mm$^2$ (i.e., 60 Joules/(6 mm×6 mm)). These calculations are shown in FIG. 6.

Figure 7:
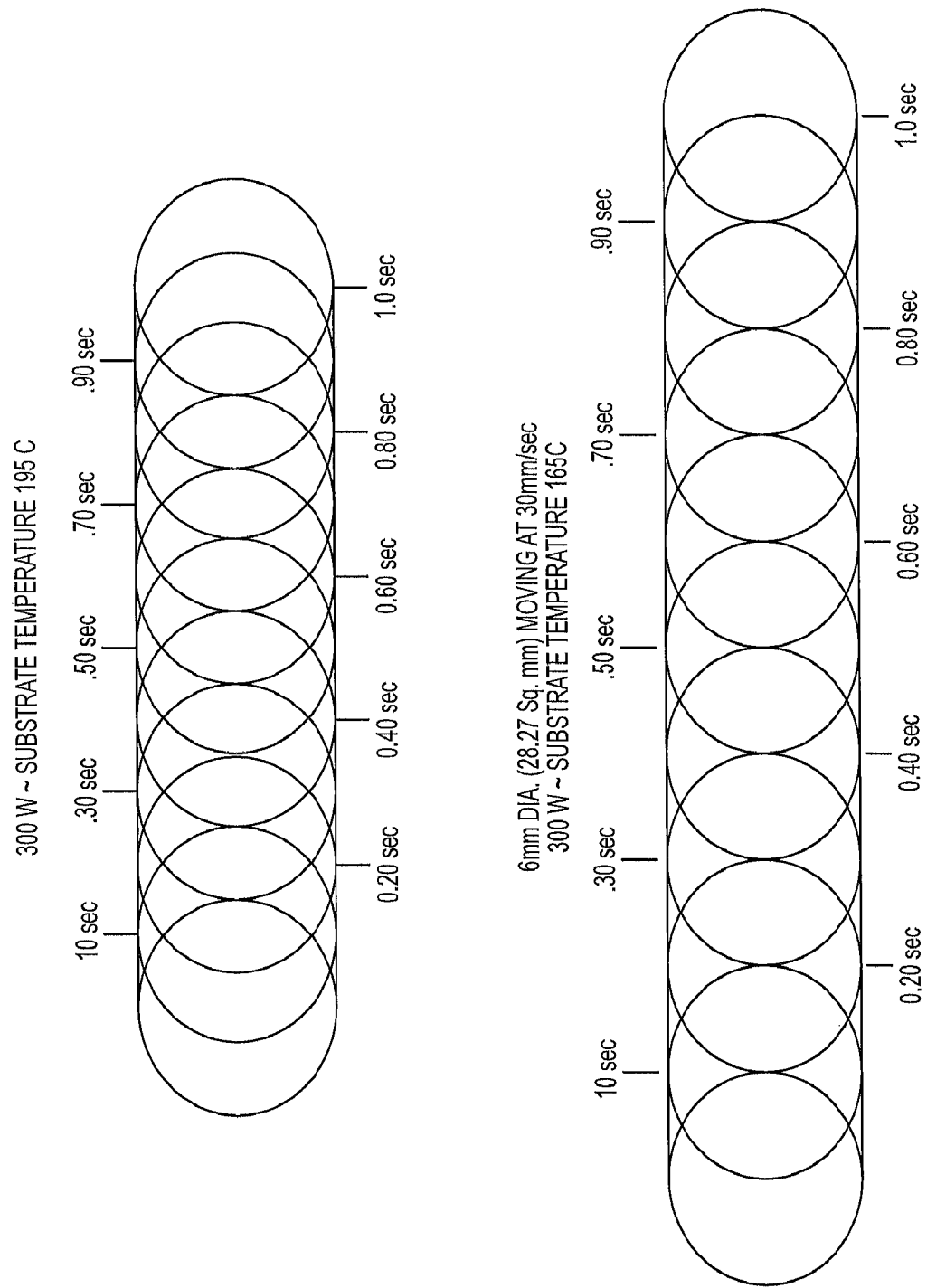

FIG. 7 shows laser energy densities for lasers moving at different speeds (20 mm/second and 30 mm/second) and various time intervals (i.e., 0, 0.1, 0.2, . . . 1 second). The material being laser annealed or conditioned is heated to a temperature of 165° C. when a 6 mm diameter laser traveling at 30 mm/sec and having an output power 300 Watt is used. The material being laser annealed or conditioned is heated to a temperature of 195° C. when a 6 mm diameter laser traveling at 20 mm/sec and having an output power 300 Watt is used.

Figure 2:
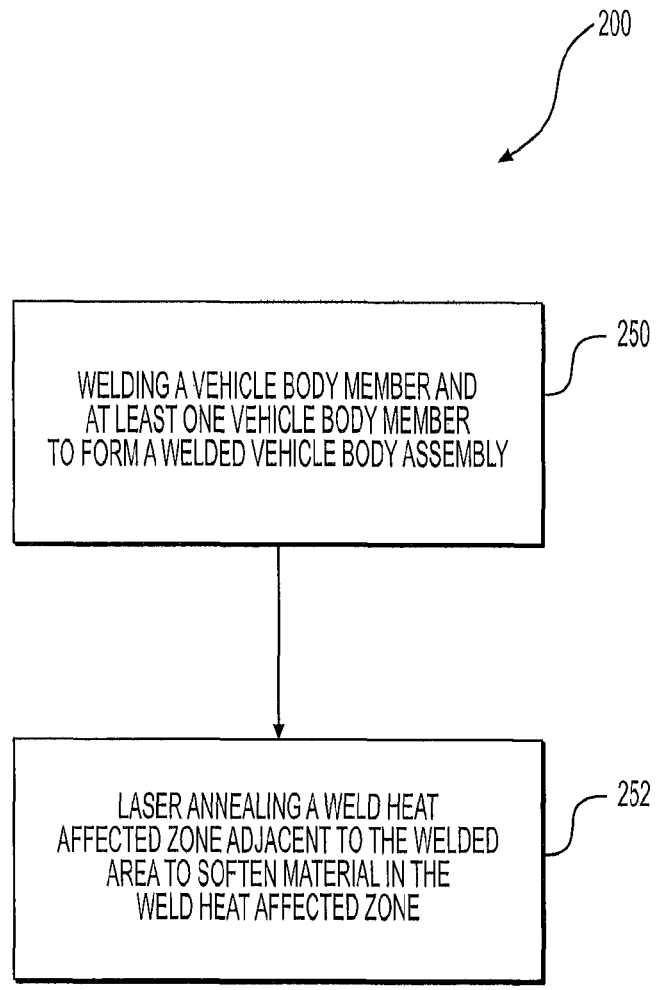
FIG. 2 illustrates a method for conditioning a welded vehicle body assembly in accordance with an embodiment of the present patent application.
Figure 2A:
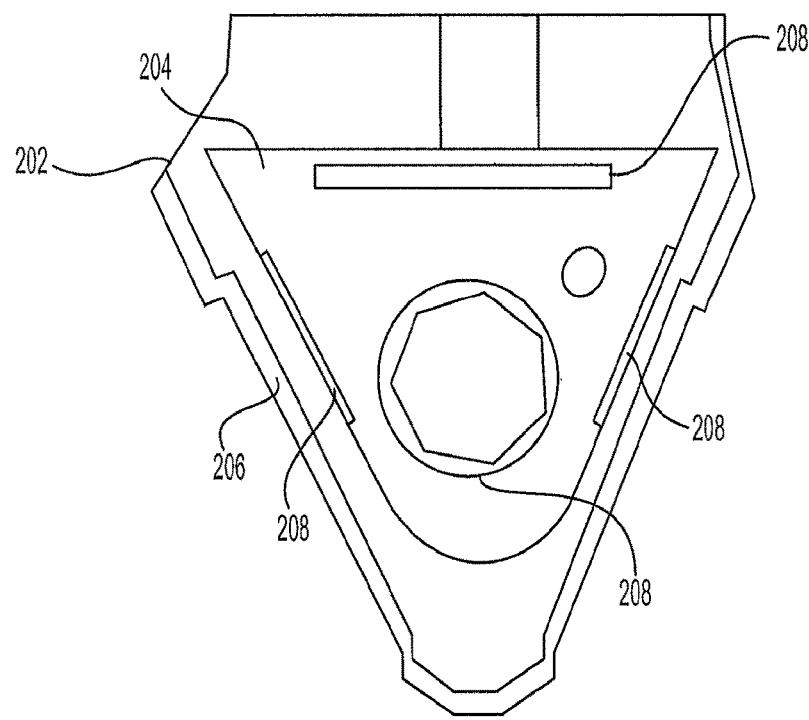
FIGS. 2A and 2B illustrate the welded vehicle body assembly before and after laser annealing, respectively, in accordance with an embodiment of the present patent application.
Figure 2B:
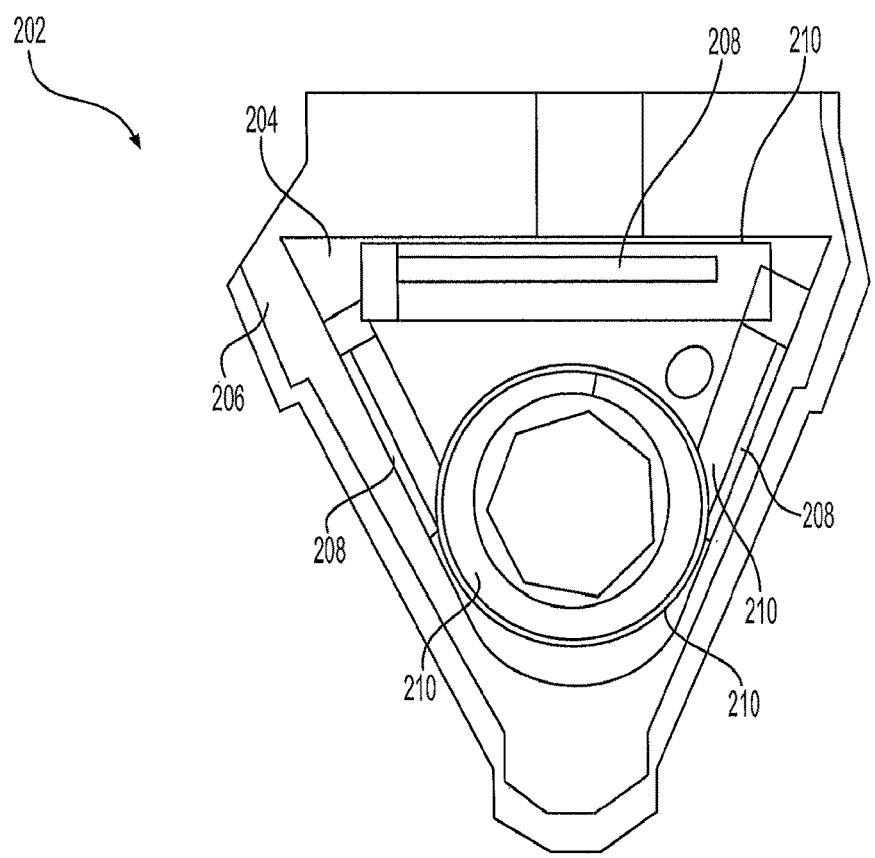

FIG. 2 illustrates a method 200 for conditioning a welded vehicle body assembly 202 (as shown in FIGS. 2A-2B). In one embodiment, the method 200 may include procedures 250 and 252. In one embodiment, the method 200 is configured to be performed after the welding operation to soften the material around the welds. In one embodiment, as the procedures 250 and 252 are performed after the welding operation, the procedures 250 and 252 may be referred to as post welding procedures. Each of these procedures 250-252 and other optional/additional procedures of the method 200 will be described in detail below.

Referring to FIGS. 2, 2A and 2B, at procedure 250, a vehicle body member 204 and at least one additional vehicle body member 206 are welded together to form the welded vehicle body assembly 202.

For example, in one embodiment, the vehicle body member 204 and the at least one additional vehicle body member 206 are formed from a steel material that is selected from a group consisting of high strength steel, ultrahigh strength steel, and hot stamped steel materials. In one embodiment, the hot stamped steel material includes hot stamped boron steel material. The vehicle body member 204 and the at least one additional vehicle body member 206 are formed from an aluminum material that is selected from a group consisting of cast aluminum and sheet aluminum. In one embodiment, the vehicle body member 204 and the at least one additional vehicle body member 206 may be formed from aluminum alloys such as A611-T4, C611, A5052, etc.

In one embodiment, the vehicle body member 204 and at least one additional vehicle body member 206 may be formed at the one or more forming stations 10F and are transferred, using the transfer system 222, to the assembly station 10A. In one embodiment, the assembly station is a welding station that is configured to weld the vehicle body member 204 and at least one additional vehicle body member 206 together to form the welded vehicle body assembly 202. In one embodiment, the welding is a Metal Insert Gas (MIG) welding. In one embodiment, the welding is selected from a group consisting of a Metal Gas Metal Arc Welding (GMAW), Metal Active Gas (MAG) welding, Tungsten Inert Gas welding (TIG), Gas Tungsten Arc welding (GTAW) and resistance welding.

In one embodiment, the welded vehicle body assembly 202 may be a twist axle suspension. The twist axle suspension is generally used for the rear suspension of the (e.g., front wheel drive) vehicles. The twist axle suspension generally includes a twist axle member and two trailing arms. The trailing arms are generally welded to the twist axle member. In one embodiment, one of the vehicle body member 204 and the at least one additional vehicle body member 206 may include the trailing arms of the twist axle suspension, while the other of the vehicle body member 204 and the at least one additional vehicle body member 206 may include the twist axle member of the twist axle suspension.

In one embodiment, the welded vehicle body assembly 202 may be any welded vehicle body assembly that is configured to transfer load therethrough. In one embodiment, the welded vehicle body assembly 202 may include engine cradles, motor mounts, trailer hitches, link arms, etc.

The welded vehicle body assembly 202 has a weld area 208. The welding procedure may harden the material in a weld heat affected zone 210 at and/or adjacent to the weld area 208. The welding procedure may also fatigue the material in the weld heat affected zone 210.

In one embodiment, the weld heat affected zone is an area of the material that is not melted and has had its microstructure and properties altered by the welding procedure. In one embodiment, the effects of the welding procedure on the material surrounding the weld may depend on the materials used and the heat input of the welding procedure used. In one embodiment, the weld heat affected zone may vary in size and strength. For example, the weld heat affected zone for the MIG welding procedure may be 10 mm surrounding or adjacent to the MIG weld area. The weld heat affected zone for the spot welding procedure may be 5 mm surrounding or adjacent to the spot weld area.

At procedure 252, the weld heat affected zone 210 adjacent to the weld area 208 is laser annealed to soften material in the weld heat affected zone 210. In one embodiment, the weld heat affected zone 210 may surround the weld area 208.

In one embodiment, the welded vehicle body assembly 202 is transferred, using the transfer system, to the laser device 20. The laser device 20 is configured to laser anneal the welded vehicle body assembly 202. In one embodiment, the laser annealing includes irradiating a laser beam from the large area laser device 20 onto the heat affected zone 210 adjacent to or surrounding the weld area 208 so as to alter or change a material property in the heat affected zone 210 of the vehicle body assembly 202 from a first material property value to a second material property value. For example, the material property that is altered can be hardness, ductility, fatigue life and/or elongation. In one embodiment, the laser annealing is configured to improve fatigue life and ductility of the material in the weld heat affected zone 210.

In one embodiment, the laser annealing may alter or change hardness in the heat affected zone 210 of the vehicle body assembly 202 from a first hardness value to a second hardness value. In one embodiment, the second hardness value is lower than the first hardness value.

In one embodiment, the laser annealing may alter or change ductility in the heat affected zone 210 of the vehicle body assembly 202 from a first ductility value to a second ductility value. In one embodiment, the second ductility value is higher than the first ductility value.

In one embodiment, the laser annealing may alter or change fatigue life in the heat affected zone 210 of the vehicle body assembly 202 from a first fatigue life value to a second fatigue life value. In one embodiment, the second fatigue life value is higher than the first fatigue life value.

In one embodiment, the laser annealing may alter or change elongation in the heat affected zone 210 of the vehicle body assembly 202 from a first elongation value to a second elongation value. In one embodiment, the second elongation value is higher than the first elongation value.

FIGS. 2A and 2B illustrate the welded vehicle body assembly 202 before and after laser annealing, respectively. In the illustrated embodiment, the vehicle body member 204 and the at least one additional vehicle body member 206 are both formed from a steel material having various strengths, or both formed from an aluminum material. In the illustrated embodiment, the vehicle body member 204 and the at least one additional vehicle body member 206 are welded together using a MIG welding procedure to form the welded vehicle body assembly 202. In one embodiment, the laser annealing of material in and around the weld heat affected zones 210 is configured to improve ductility and fatigue life of the material in and around the weld heat affected zones 210. That is, heat from the laser annealing procedure is configured to improve ductility and fatigue life of the material in and around the weld heat affected zones 210.

In one embodiment, the method 200 for conditioning of the heat affected weld zones may be an automated procedure. For example, in one embodiment, each of the forming station(s), the assembly station(s), and the laser conditioning system, used in the method 200, may be preprogrammed to precisely control their respective operational procedures. In one embodiment, the operation parameters of the laser device 20 may be automatically controlled by the feedback system 31 to achieve the optimum the laser conditioning or annealing of the heat affected zones. In one embodiment, the transfer system may be preprogrammed to move or transfer the vehicle body assembly/member between the forming station(s), the assembly station(s), and the laser conditioning system during the operational procedures of the method 200.

Figure 3:
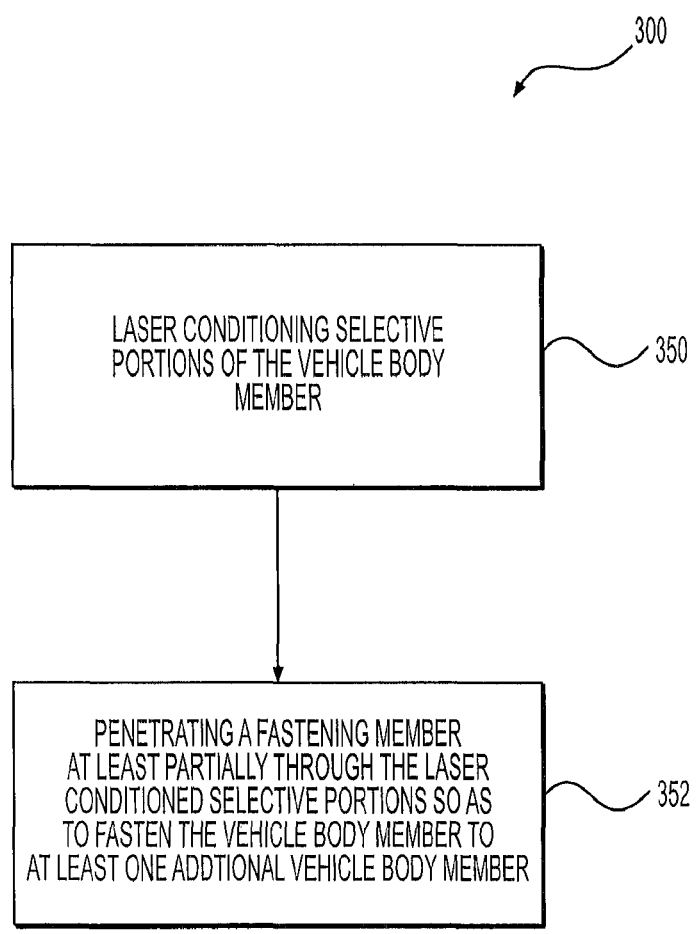
FIG. 3 illustrates a method for conditioning a vehicle body assembly to enable penetration of a fastening member that fastens a vehicle body member of the vehicle body assembly to at least one additional vehicle body member in accordance with an embodiment of the present patent application.

FIG. 3 illustrates a method 300 for conditioning a vehicle body assembly 302 to enable penetration of a fastening member 304 that fastens a vehicle body member 306 of the vehicle body assembly 302 to at least one additional vehicle body member 308. In one embodiment, the method 300 may include procedures 350 and 352. Each of these procedures 350-352 and other optional/additional procedures of the method 300 will be described in detail below.

Referring to FIGS. 1A and 3-4C, at procedure 350, selective portions 310 of the vehicle body member 306 are laser conditioned.

In one embodiment, the vehicle body member 306 may be formed from an aluminum material that is selected from a group consisting of cast aluminum and sheet aluminum. In one embodiment, the vehicle body member 306 may be formed from an aluminum material that is suitable for high pressure die casting procedure. In one embodiment, the vehicle body member 306 may be formed from a steel material that is selected from a group consisting of high strength steel, ultrahigh strength steel, and hot stamped steel materials.

In one embodiment, the vehicle body member 306 may be formed at the forming stations 10F and is transferred, using the transfer system 222, to the laser conditioning system 10LC. In one embodiment, the vehicle body member 306 may be formed at a die casting station 10F using a high pressure casting procedure or other casting procedures and is transferred, using the transfer system 222, to the laser conditioning system 10LC. In one embodiment, the vehicle body member 306 may be formed at the forming stations 10F and is transferred, using the transfer system 222, to the assembly station 10A. In one embodiment, the assembly station 10A may be configured to assemble the vehicle body member 306 with additional vehicle body member(s) to form vehicle body assembly 302. In one embodiment, the vehicle body assembly 302 may be made at a die casting station 10F using a high pressure casting procedure or other casting procedures.

In one embodiment, the laser conditioning may include irradiating a laser beam from the large area laser device 20 onto the selective portions 310 of the vehicle body member 306. In one embodiment, the laser conditioning is configured to alter or change a material property of the selective portions 310 of the vehicle body member 306 from a first material property value to a second material property value. In one embodiment, the laser conditioning is configured to improve elongation of the material in the selective portions 310 of the vehicle body member 306. For example, the material property may include hardness and/or elongation.

In one embodiment, the laser conditioning may alter or change hardness of the material in the selective portions 310 of the vehicle body member 306 from a first hardness value to a second hardness value. In one embodiment, the second hardness value is lower than the first hardness value. In one embodiment, the selective portions 310 of the vehicle body member 306 are softer after the laser annealing or conditioning procedure.

In one embodiment, the laser annealing may alter or change elongation of the material in the selective portions 310 of the vehicle body member 306 from a first elongation value to a second elongation value. In one embodiment, the second elongation value is higher than the first elongation value. For example, the improved elongation of the material in the selective portions 310 of the vehicle body member 306 is configured to allow for setting self-piercing rivets. In one embodiment, the laser conditioning of the high pressure die castings is configured to prevent microcracking and subsequent corrosion on the "button" side of the self-piercing rivet.

Figure 3A:
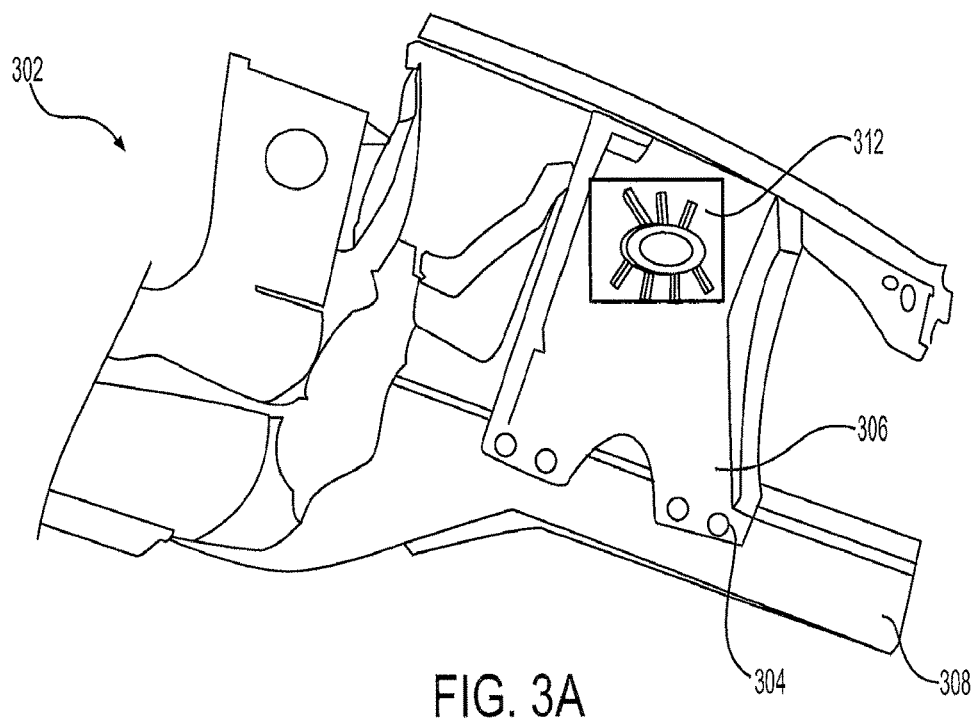
FIG. 3A illustrates the vehicle body assembly for laser conditioning in accordance with an embodiment of the present patent application.
Figure 3B:
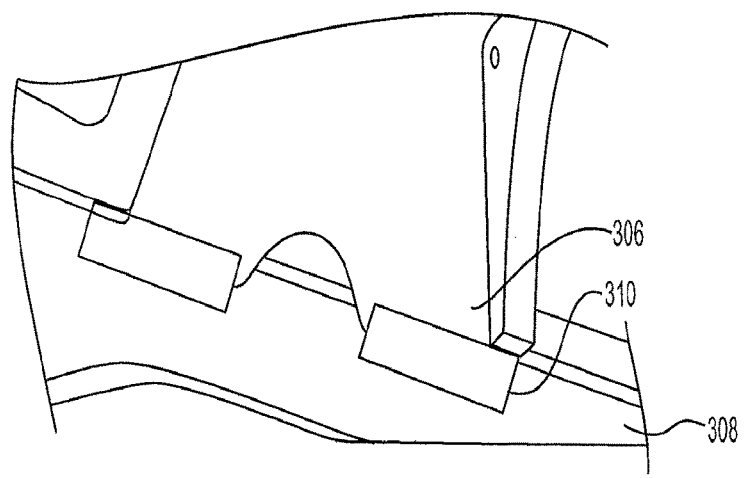
FIG. 3B illustrates portions of the vehicle body assembly (of FIG. 3A) to be laser conditioned or annealed in accordance with an embodiment of the present patent application.

In one embodiment, the selective portions 310 of the vehicle body member 306 include fastening flanges 310 of the vehicle body assembly 302. That is, the fastening flanges 310 of the vehicle body assembly 302 may be laser conditioned to allow for setting the self-piercing rivets 304. In one embodiment, the selective portions 310 may include one or more separate and adjacently disposed portions or fastening flanges as shown in FIG. 3B. In another embodiment, the selective portions 310 may include a single elongated fastening flange as shown in FIG. 4B.

In one embodiment, the vehicle body assembly 302 may include engine cradles, control arms, transverse axles, sheet metal sub-assemblies, instrument panel beams, rails, underbody structures, bumper beams, etc.

At procedure 352, penetrating the fastening member 304 at least partially through the laser conditioned selective portions 310 so as to fasten the vehicle body member 306 to at least one additional vehicle body member 308.

In one embodiment, the fastening member 304 may be a self-piercing rivet. In one embodiment, the self-piercing rivet 304 may generally include a head portion and annular wall portion extending from the head portion. When the rivet is driven, for example, by a punch and die system 331 and 332, into two sheets of body members or panels 306 and 308 to be riveted, the annular wall portion deforms outwardly while deforming the members or panels 306 and 308 to couple the members or panels 306 and 308 to each other by the deformed annular wall portion. In one embodiment, the self-piercing rivets 304 may be formed from a steel material or any other suitable material. In one embodiment, the self-piercing rivet 304 may be a low-force self-piercing rivet.

In one embodiment, the vehicle body member 308 may be formed at the forming stations. In one embodiment, the vehicle body member 308 may be formed at a die casting station using a high pressure die casting procedure or other casting procedures. In one embodiment, the vehicle body member 308 may be a part of a vehicle body assembly. In one embodiment, the vehicle body member 308 may be formed from a steel material that is selected from a group consisting of high strength steel, ultrahigh strength steel, hot stamped boron steel, or cast steel and an aluminum material that is selected from a group consisting of cast aluminum and sheet aluminum.

Figure 3C:
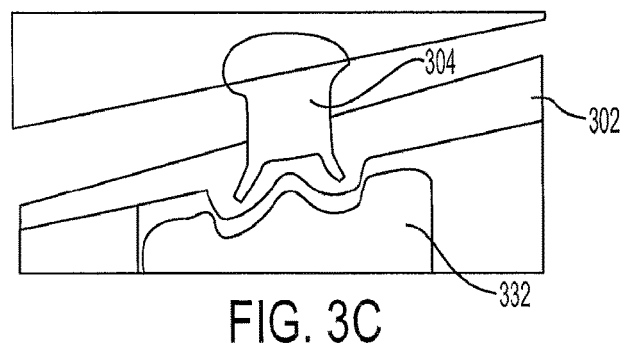
FIG. 3C illustrates portions of the vehicle body assembly (of FIG. 3A) after a fastening member is used to fasten the laser conditioned portions together in accordance with an embodiment of the present patent application.

In one embodiment, the penetrating procedure may include positioning the vehicle body member 308 and the laser conditioned vehicle body member 306 in a die and punch system (punch 331 and die 332 are shown in FIG. 3C), and driving the rivet 304, using the punch 331, into the laser conditioned selective portions 310 of the vehicle body member 306 and the vehicle body member 308 such that the rivet 304 deforms while deforming the members 306 and 308 to couple them to each other.

Figure 3D:
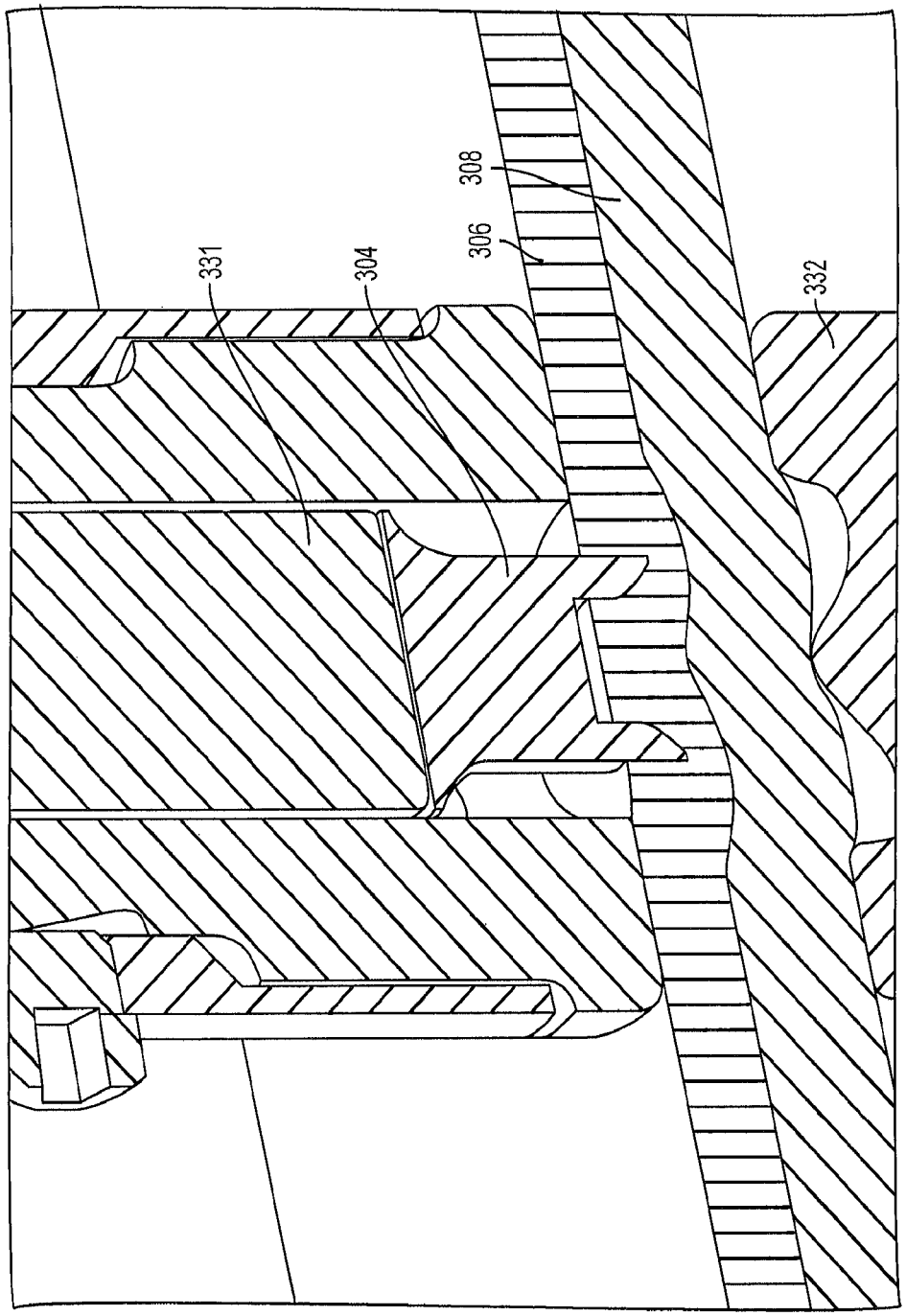
FIG. 3D illustrates a punch and die system with the fastening member being driven by the punch into the laser conditioned portions of the vehicle body members in accordance with an embodiment of the present patent application.

FIG. 3D shows the punch 331 and die 332 with the rivet 304 being driven by the punch 331 into the laser conditioned selective portions 310 of the vehicle body member 306 and the vehicle body member 308. In one embodiment, the punch 331 and die 332 may be a servo riveting gun. In one embodiment, the punch 331 and die 332 may be a self-piercing rivet tool. In one embodiment, the punch 331 and die 332 may be an ERT80 riveting tool. In one embodiment, the die 332 may be a M260 254 die. In one embodiment, the rivet may be a C5,3×11,0H4

FIG. 3A illustrates the vehicle body assembly 302, while FIGS. 3B and 3C illustrate portions 310 of the vehicle body assembly 302 (of FIG. 3A) to be laser conditioned and after the fastening member 304 is used to fasten the laser conditioned vehicle body member 306 and the vehicle body assembly 308. In the illustrated embodiment, the vehicle body member 306 is formed from an aluminum material and using a high pressure die casting procedure and the vehicle body member 308 is a steel or aluminum sheet or castings. As shown in FIG. 3B, the fastening flanges 310 of the vehicle body member 306 are laser conditioned using a laser beam from the large area laser device 20. Referring to FIG. 3C, the laser conditioned vehicle body member 306 and the vehicle body assembly 308 are positioned in the punch and die system 331 and 332. The rivet 304 is driven into the laser conditioned selective portions 310 of the vehicle body member 306 and the vehicle body member 308 to connect them to each other.

In one embodiment, material conditioning of high pressure die cast aluminum is configured to prevent cracking of the work piece or member on the "button" side of the self-piercing rivets 304. In one embodiment, the laser annealing procedure is configured to condition the material in the selective portions 310 of the vehicle body member 306 and provide improved elongation of the material in the selective portions 310 of the vehicle body member 306. In one embodiment, the improved elongation of the material in the selective portions 310 of the vehicle body member 306 is configured to allow for setting self-piercing rivets and to prevent cracking of casting on the "button" side of the self-piercing rivets 304. The "button" side of self-piercing rivets 304 generally refers to the side of the self-piercing rivet with the annular wall portion (i.e., opposing the head portion of the self-piercing rivet) that is deformed during the riveting operation. In one embodiment, the laser conditioned high strength steel is configured to allow for easier penetration of self-piercing rivet.

As shown in FIG. 3A, in one embodiment, other localized areas or portions 312 of the vehicle body assembly 302 may be laser conditioned to meet performance specifications. For example, the performance specifications may include safety performance specifications for different crash types (e.g., front impact, side impact, rear impact, etc.). In one embodiment, the performance specifications may include fatigue life. In one embodiment, the localized areas or portions 312 of the vehicle body assembly 302 may be laser conditioned to improve fatigue life of the material being conditioned. In one embodiment, the performance specifications may include strength, bending or yield. In one embodiment, the localized areas or portions 312 of the vehicle body assembly 302 may be laser conditioned to improve strength, bending or yield of the material being conditioned.

Figure 4A:
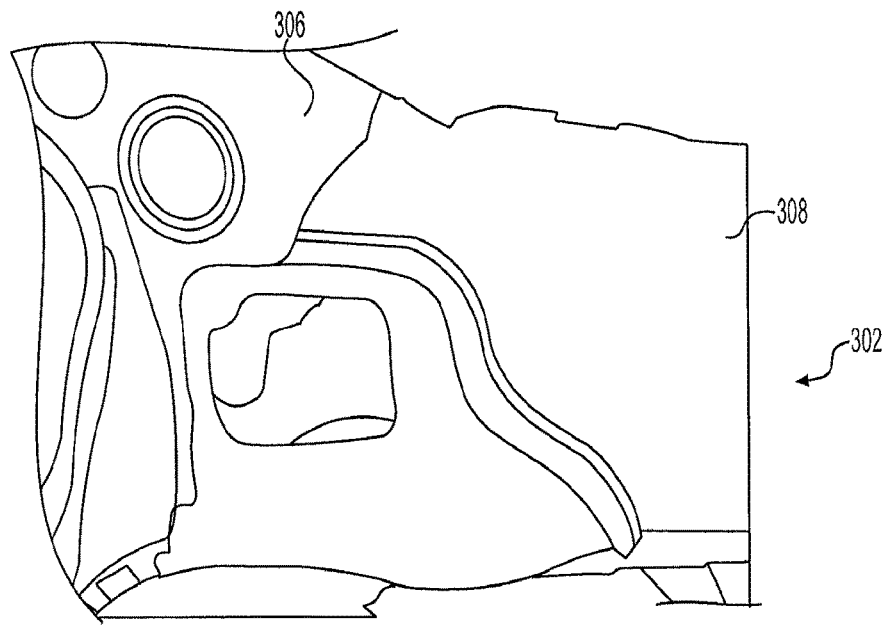
FIG. 4A illustrates the vehicle body assembly before laser conditioning in accordance with an embodiment of the present patent application.
Figure 4B:
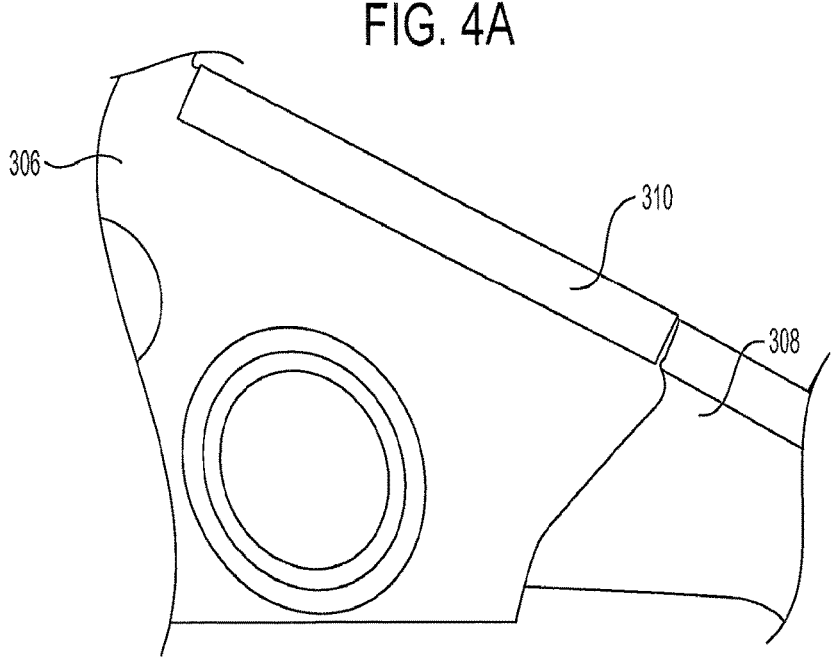
FIG. 4B illustrates portions of the vehicle body assembly (of FIG. 4A) to be laser conditioned or annealed in accordance with an embodiment of the present patent application.
Figure 4C:
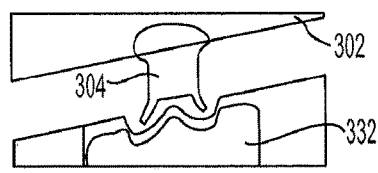
FIG. 4C illustrates portions of the vehicle body assembly (of FIG. 4A) after a fastening member is used to fasten laser conditioned portions together in accordance with an embodiment of the present patent application.

FIG. 4A illustrates the vehicle body assembly 302 before laser conditioning procedure. FIG. 4B illustrates portions of the vehicle body assembly (of FIG. 4A) to be laser conditioned. FIG. 4C illustrates portions of the vehicle body assembly (of FIG. 4A) after the fastening member 304 is used to fasten the laser conditioned vehicle body member 306 and the vehicle body assembly 308. In the illustrated embodiment, the vehicle body member 306 is formed from a steel material that is selected from a group consisting of high strength steel, ultrahigh strength steel, hot stamped boron steel, or cast steel and the vehicle body member 308 is formed from an aluminum material that is selected from a group consisting of cast aluminum and sheet aluminum. As shown in FIG. 4B, the fastening flanges 310 of the vehicle body member 306 are laser conditioned using a laser beam from the large area laser device 20. Referring to FIG. 4C, the laser conditioned vehicle body member 306 and the vehicle body assembly 308 are positioned in the punch and die system 331 and 332. The rivet 304 is driven into the vehicle body member 308 and the laser conditioned selective portions 310 of the vehicle body member 306 to connect them to each other. In one embodiment, material conditioning of hot Stamped Boron Steel is configured to allow for setting the standard low force self-piercing rivets.

Figure 5:
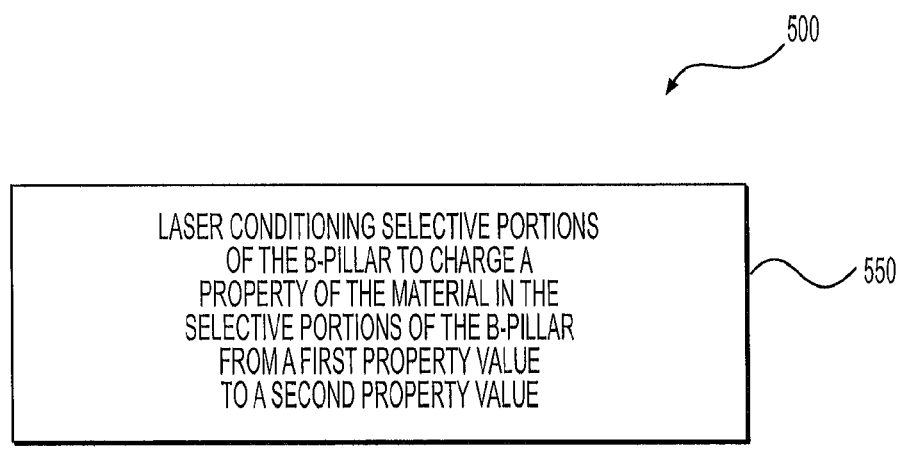
FIG. 5 illustrates a method for conditioning a B-pillar in accordance with an embodiment of the present patent application.
Figure 5B:
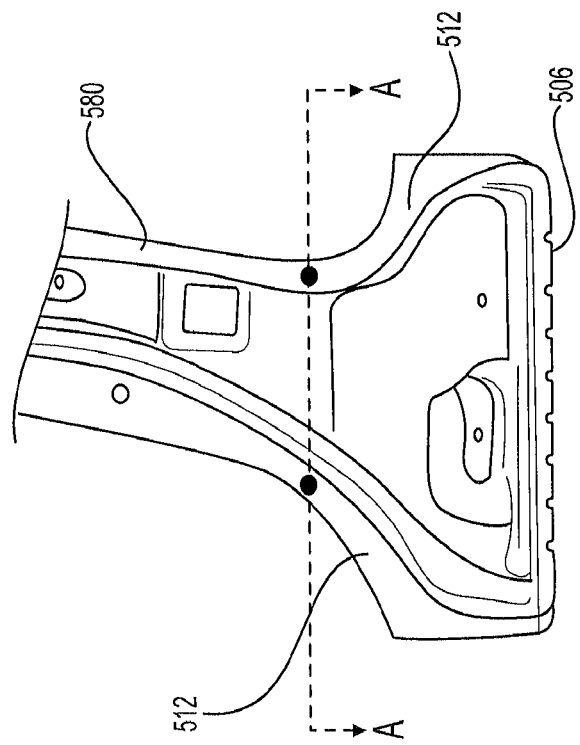
FIGS. 5A and 5B illustrate the B-pillar and portions thereof, respectively, where

FIG. 5 illustrates a method 500 for conditioning a B-pillar 580 of a vehicle. In one embodiment, the method 500 may include procedure 550. The procedure 550 and other optional/additional procedures of the method 500 will be described in detail below. FIGS. 5A and 5B illustrate the B-pillar and the lower portion thereof, respectively. FIGS. 5A and 5B illustrate locations at which the B-pillar is conditioned.

Figure 5C:
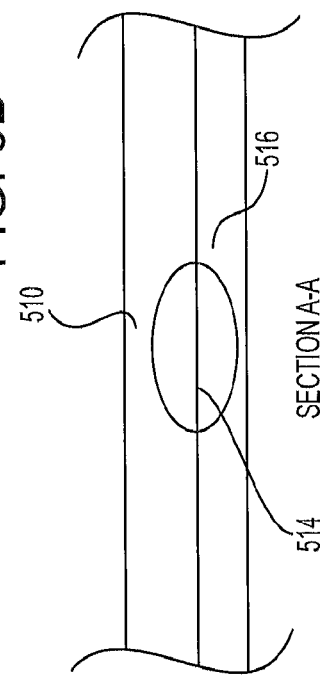
FIG. 5C illustrates a cross sectional view of a portion of the B-pillar taken along an axis A-A in FIG. 5B showing a weld nugget/area and a heat affected zone surrounding the weld nugget/area in accordance with an embodiment of the present patent application.
Figure 5A:
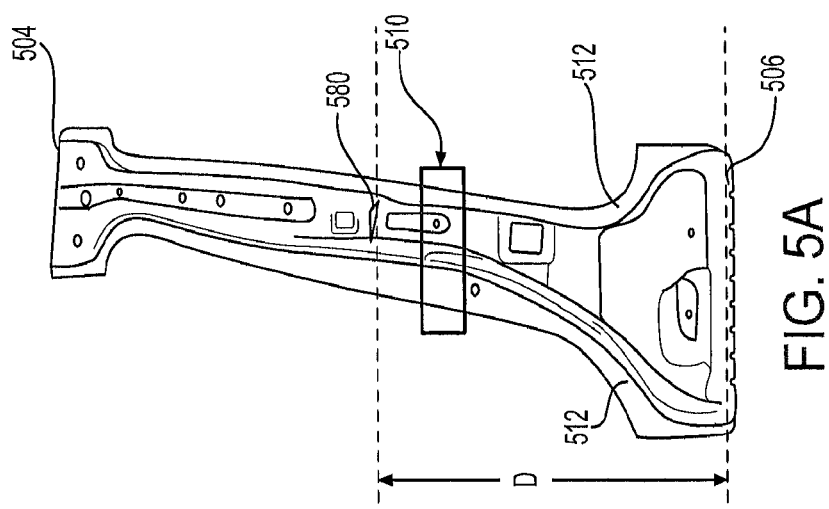

Referring to FIGS. 5A-5C, the B-pillar 580 has a top end 504 and a bottom end 506. At procedure 502, laser conditioning selective portions 510 of the B-pillar 580 to change a property of the material in the selective portions 510 of the B-pillar 580 from a first property value to a second property value as discussed previously. In one embodiment, the material property may be ductility or elongation. In one embodiment, the laser conditioning selective portions 510 of the B-pillar 580 have higher ductility and/or higher elongation compared to other portions of the B-pillar. In one embodiment, the laser conditioning selective portions 510 of the B-pillar 580 are relatively softer than other portions of the B-pillar. In one embodiment, the laser conditioning procedure 502 includes irradiating a laser beam from the large area laser device 20 onto the selective portions 510 of the B-pillar.

The selective portions 510 of the B-pillar 580 are disposed at a distance D in a range of 6 to 12 inches from the bottom end 506 of the B-pillar 580. In one embodiment, the selective portions 510 of the B-pillar 580 are disposed from the bottom end 506 of the B-pillar 580 to up to half of the total length of the B-pillar. In one embodiment, the selective portions 510 of the B-pillar 580 are disposed from the bottom end 506 of the B-pillar 580 to up to one fourth of the total length of the B-pillar. In one embodiment, the selective portions 510 of the B-pillar 580 are disposed from the bottom end 506 of the B-pillar 580 to up to one third of the total length of the B-pillar 580. In one embodiment, the selective portions 510 of the B-pillar 580 are disposed from the bottom end 506 of the B-pillar 580 to up to two thirds of the total length of the B-pillar.

In one embodiment, the B-pillar 580 may be formed from Hot Stamped Boron Steel, High Strength Steel or Ultra High Strength Steel.

In one embodiment, the B-pillar 580 may include flanges 512 as shown in FIGS. 5A and 5B. The flanges 512 of the B-pillar 580 are constructed and arranged to enable a cover panel/member and/or inner and outer skin members/panels be connected thereto to form a closed profile configuration. For example, the cover panel/member and/or inner and outer skin members/panels may be connected to the flanges 512 of the B-pillar 580 using a spot welding procedure. FIG. 5C illustrates a cross sectional view of a portion of the B-pillar taken along an axis A-A in FIG. 5B showing a spot weld nugget/area 514 and a heat affected zone 516 surrounding the spot weld nugget/area 514. In one embodiment, the laser device 20 is configured to laser anneal the spot weld heat affected zone 516 surrounding and adjacent to the spot weld area/nugget 514 to soften material in the spot weld heat affected zone 516. In one embodiment, the laser conditioned selective portions of the B-pillar 580 includes the spot weld heat affected zone 516. In one embodiment, laser material conditioning or annealing is performed after the spot welding procedure and is configured to improve ductility, elongation and fatigue life. In one embodiment, laser material conditioning or annealing procedure of the B-pillar is a post welding procedure.

The method 500 is configured to induce tailor-tempered properties in the hot stamped steel panels, for example, B-pillars.

In one embodiment, the laser conditioned selective portions are configured to provide stress relief areas in the B-pillar. In one embodiment, the laser conditioned selective portions of the B-pillar have higher elongation and higher ductility compared to the rest of the portions of the B-pillar. Thus, these softer, laser conditioned selective portions of the B-pillar are configured to provide stress relief areas in the B-pillar. That is, these stress relief areas in the B-pillar are configured to provide stress relief to the B-pillar, when a load is applied to the B-pillar.

In one embodiment, the laser conditioned selective portions are configured to perform as crash initiators in the B-pillar. In one embodiment, the softer, laser conditioned selective portions (with relatively higher elongation and/or higher ductility properties) of the B-pillar are configured to act as crash initiators. That is, the crash initiators of the B-pillar are configured to provide a weak point/location that causes the B-pillar to bend/flex, when a load is applied to the B-pillar, rather than being pushed into the vehicle.

In one embodiment, the laser conditioned selective portions are positioned on the B-pillar, for example, below the belt line of the vehicle body. In one embodiment, the laser conditioned selective portions are positioned on the B-pillar, for example, below the door striker of the vehicle.

In one embodiment, the laser conditioned selective portions are configured to absorb energy due to an impact on the B-pillar. In one embodiment, the softer, laser conditioned selective portions (with relatively higher elongation and/or higher ductility properties) of the B-pillar are configured to absorb more energy (compared to other portions of the B-pillar) due to an impact on the B-pillar.

In one embodiment, the present application contemplates that the method 500 for conditioning may be used for other pillars of the vehicle, such as A-pillar, C-pillar or D-pillar. In another embodiment, the present application contemplates that the method 500 for conditioning may be used for other vertical or near vertical support member of the vehicle. In another embodiment, the present application contemplates that the method 500 for conditioning may be used for front rail member, crash cans, side impact rail members, etc.

Thus, the present patent application provides a laser conditioning system and method wherein a high pressure aluminum die cast vehicle body member can be laser conditioned to increase elongation to allow for setting self-piercing rivets. For aluminum castings and steels, the mechanical material properties are altered in localized areas by laser conditioning in order to meet performance specifications without the need to heat treat the entire part. For high, ultra high or hot stamped steels being riveted to aluminum sheet, the steel is laser annealed to allow for the use of standard rivets and equipment. For the annealing of high strength, ultra high strength, hot stamped steels or aluminum in heat affected zones around MIG or spot welds, the fatigue life and ductility of the material in the heat affected zone is improved.

In one embodiment, the manufacturing facility may be a vehicle, car, automotive or automobile manufacturing facility. The manufacturing facility includes the forming station and the assembly station that receives stamped or formed vehicle body members and forms the vehicle body assemblies. The manufacturing facility also includes the laser conditioning system that is configured to receive vehicle body assemblies from the assembly station or receive vehicle body member from the forming station, and to condition the material of the vehicle body assemblies and/or vehicle body member.

In one embodiment, the manufacturing facility may also include a paint shop (not shown) where the vehicle body assembly, from the body shop, is painted with a primer coating, one or more color coating(s) and one or more clear coating(s). In one embodiment, the manufacturing facility may also include a chassis facility where the painted vehicle body assembly is attached or coupled to vehicle chassis and powertrain components (including vehicle engine, vehicle transmission, and vehicle drive shafts). In one embodiment, the manufacturing facility may also include a general assembly facility where interior vehicle components, some exterior vehicle components, vehicle doors and trim panels, and vehicle seating are attached to the vehicle assembly from the chassis facility. In another embodiment, the manufacturing facility may include the assembly station, the forming station and the laser conditioning system and may not include the paint shop, chassis facility, and general assembly.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

What is claimed is:

1. A method for conditioning a vehicle body member, the method comprising:
    laser conditioning selective portions of the vehicle body member by a laser device in a laser conditioning operation, the laser device outputting a continuous laser beam moving relative to the vehicle body member at a laser beam travel speed, wherein said moving of the laser beam relative to the vehicle body member comprises moving the laser device relative to the body member, moving the body member relative to the laser device, or a combination thereof;
    collecting laser conditioning data of the selective portions of the vehicle body member, the laser conditioning data of the selective portions of the vehicle body member comprising temperature data of the selective portions of the material of the vehicle body member being laser conditioned;
    modifying the laser conditioning operation if the laser conditioning data of the selective portions of the vehicle body member is outside a threshold;
    wherein the modifying of the laser conditioning operation modifies a laser energy density and/or the laser beam travel speed relative to the vehicle body member; and
    sequentially penetrating a fastening member at least partially through the laser conditioned selective portions of the vehicle body member that have been correspondingly selectively laser conditioned by the laser beam, so as to fasten the vehicle body member to at least one additional vehicle body member to form a vehicle body assembly.

2. The method of claim 1, wherein the fastening member includes a self-piercing rivet.

3. The method of claim 1, wherein the vehicle body member is made from a metal material selected from a group consisting of high strength steel, ultra-high strength steel, and hot stamped steel materials, and
    wherein the at least one additional vehicle body member is made from a metal material selected from a group consisting of cast aluminum, high pressure die cast aluminum, and sheet aluminum materials.

4. The method of claim 1, wherein the vehicle body member is made from high pressure die cast aluminum, and
    wherein the at least one additional vehicle body member is made from a metal material that is selected from a group consisting of sheet aluminum, high strength steel, ultra-high strength steel, and hot stamped steel materials.

5. The method of claim 1, wherein the vehicle body member is formed from a hot stamping procedure or a casting procedure.

6. The method of claim 1, wherein the vehicle body member is a formed from a sheet material.

7. The method of claim 1, wherein the selective portions include are disposed on fastening flanges of the vehicle body member.

8. The method of claim 7, wherein the selective portions disposed on the fastening flanges of the vehicle body member include one or more separate and adjacently disposed fastening flange portions.

9. The method of claim 7, wherein the selective portions disposed on the fastening flanges of the vehicle body member include a single elongated fastening flange portion.

10. The method of claim 1, wherein the laser conditioning is configured to increase elongation of the material in the selective portions of the vehicle body member.

11. The method of claim 1, wherein the laser conditioning is configured to change a material property of the selective portions of the vehicle body member from a first material property value to a second material property value.

12. The method of claim 11, wherein the material property is elongation or ductility.

13. The method of claim 1, wherein the laser conditioning includes irradiating a laser beam from a large area laser onto the selective portions of the vehicle body member.

14. The method of claim 1, wherein the collecting laser conditioning data of the selective portions of the vehicle body member comprises imaging a rear or back side of the material of the selective portions of the vehicle body member that are being conditioned.

15. The method of claim 1, wherein the modifying of the laser conditioning operation modifies the predetermined laser beam travel speed across the vehicle body member and the predetermined laser spot size.

16. The method of claim 1, wherein the laser conditioning procedure, collecting procedure, and modifying procedure are performed at a laser conditioning station;
    wherein the penetrating procedure is performed at an assembly station;
    further comprising transferring the laser conditioned selective portions of the vehicle body member from the laser conditioning station to the assembly station,
    wherein the laser conditioning station is disposed, in a manufacturing facility, within a predetermined distance from the assembly station.

17. The method of claim 16, wherein the laser conditioning station is disposed sequentially adjacent to the assembly station.

* * * * *